(12) United States Patent
Chen et al.

(10) Patent No.: US 10,861,110 B2
(45) Date of Patent: Dec. 8, 2020

(54) COLLABORATIVE SYSTEM AND METHOD FOR PERFORMING WELLSITE TASKS

(71) Applicant: SCHLUMBERGER TECHNOLOGY CORPORATION, Sugar Land, TX (US)

(72) Inventors: Yang Chen, Houston, TX (US); Chuanqing James Lu, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 859 days.

(21) Appl. No.: 14/451,367

(22) Filed: Aug. 4, 2014

(65) Prior Publication Data

US 2016/0035048 A1 Feb. 4, 2016

(51) Int. Cl.
*G06Q 10/10* (2012.01)
*G06Q 50/06* (2012.01)

(52) U.S. Cl.
CPC ........... *G06Q 50/06* (2013.01); *G06Q 10/103* (2013.01)

(58) Field of Classification Search
CPC .............................. G06Q 50/06; G06Q 10/103
USPC ........................................................... 703/10
See application file for complete search history.

(56) References Cited

U.S. PATENT DOCUMENTS

| | | | | |
|---|---|---|---|---|
| 6,693,553 | B1 * | 2/2004 | Ciglenec | E21B 23/14 340/853.1 |
| 6,967,589 | B1 * | 11/2005 | Peters | E21B 47/00 166/250.15 |
| 6,980,929 | B2 * | 12/2005 | Aronstam | G06Q 10/06 702/188 |
| 6,985,750 | B1 * | 1/2006 | Vicknair | H04W 8/20 370/310 |
| 7,079,952 | B2 * | 7/2006 | Thomas | E21B 43/14 702/13 |

(Continued)

FOREIGN PATENT DOCUMENTS

KR    10-2012-0038876 A    4/2012

OTHER PUBLICATIONS

Cosad et al. ("Wellsite Support from Afar", Oilfield Review, Schlumberger, 2009, pp. 48-58) (Year: 2009).*

(Continued)

*Primary Examiner* — Iftekhar A Khan
(74) *Attorney, Agent, or Firm* — Rodney Warfford

(57) ABSTRACT

A collaborative system and method for performing wellsite tasks for performing oilfield operations is provided. The system includes a universal bank to store wellsite materials and wellsite instructions, a tag to identify the new wellsite materials, a mobile unit carried by an operator at the wellsite, and a universal bank. The mobile unit is connectable to the universal bank via a wellsite communication link, and includes a wellsite input and a wellsite receiver. The universal bank is connectable to universal resources via a universal communication link, and includes a universal receiver to receive the new wellsite materials from the universal bank. The universal bank includes a universal input to upload universal materials and validated wellsite instructions to the universal bank based on the input wellsite materials whereby wellsite materials and wellsite instructions are selectively accessible by the operator.

16 Claims, 13 Drawing Sheets

(56) References Cited

U.S. PATENT DOCUMENTS

| | | | |
|---|---|---|---|
| 7,103,511 B2* | 9/2006 | Petite | G05B 23/0208 |
| | | | 702/188 |
| 7,325,606 B1* | 2/2008 | Vail, III | E21B 43/128 |
| | | | 166/250.15 |
| 8,154,419 B2 | 4/2012 | Daussin et al. | |
| 8,190,458 B2* | 5/2012 | Back | G06Q 30/0202 |
| | | | 705/7.31 |
| 8,616,274 B2 | 12/2013 | Belcher et al. | |
| 8,692,685 B2* | 4/2014 | Estevez | H04L 67/12 |
| | | | 340/853.1 |
| 9,038,725 B2* | 5/2015 | Daussin | E21B 43/25 |
| | | | 166/305.1 |
| 9,229,603 B2* | 1/2016 | Deimbacher | G06Q 10/06 |
| 9,934,479 B2* | 4/2018 | Sanchez | E21B 41/0092 |
| 10,452,753 B2* | 10/2019 | Gunturu | G06T 11/206 |
| 2002/0052769 A1* | 5/2002 | Navani | G06Q 10/08 |
| | | | 719/316 |
| 2003/0058125 A1* | 3/2003 | Ciglenec | E21B 49/10 |
| | | | 340/853.1 |
| 2003/0088534 A1* | 5/2003 | Kalantar | G06Q 10/06 |
| | | | 706/50 |
| 2004/0010587 A1* | 1/2004 | Altamirano | E21B 47/12 |
| | | | 709/224 |
| 2004/0078373 A1* | 4/2004 | Ghoneimy | G06Q 10/10 |
| 2004/0260594 A1 | 12/2004 | Maddox | |
| 2005/0119911 A1* | 6/2005 | Ayan | G01V 11/00 |
| | | | 703/10 |
| 2005/0167098 A1* | 8/2005 | Lovell | E21B 47/13 |
| | | | 166/248 |
| 2005/0189142 A1* | 9/2005 | Garcia | E21B 47/12 |
| | | | 175/24 |
| 2005/0209912 A1* | 9/2005 | Veeningen | G06Q 10/06 |
| | | | 705/7.12 |
| 2006/0074732 A1* | 4/2006 | Shukla | G06Q 10/06 |
| | | | 717/106 |
| 2006/0195510 A1* | 8/2006 | McNally | H04W 99/00 |
| | | | 709/203 |
| 2007/0168132 A1* | 7/2007 | Yu | E21B 47/12 |
| | | | 702/6 |
| 2007/0199721 A1* | 8/2007 | Givens | G06Q 10/06312 |
| | | | 166/382 |
| 2008/0126168 A1* | 5/2008 | Carney | G06Q 10/06316 |
| | | | 705/7.26 |
| 2008/0133194 A1* | 6/2008 | Klumpen | E21B 49/00 |
| | | | 703/10 |
| 2008/0162085 A1* | 7/2008 | Clayton | G05B 23/0262 |
| | | | 702/188 |
| 2008/0162248 A1* | 7/2008 | Vachon | G06Q 10/06 |
| | | | 705/7.13 |
| 2008/0172272 A1* | 7/2008 | Back | G06Q 30/0202 |
| | | | 705/7.36 |
| 2008/0183415 A1* | 7/2008 | Dykstra | E21B 41/00 |
| | | | 702/113 |
| 2008/0231466 A1* | 9/2008 | Mazrooee | H04L 12/4625 |
| | | | 340/853.1 |
| 2008/0262802 A1* | 10/2008 | Halabe | E21B 43/00 |
| | | | 703/1 |
| 2008/0306803 A1* | 12/2008 | Vaal | E21B 41/00 |
| | | | 705/7.26 |
| 2009/0055141 A1* | 2/2009 | Moncorge | E21B 49/00 |
| | | | 703/2 |
| 2009/0153354 A1* | 6/2009 | Daussin | E21B 47/12 |
| | | | 340/853.1 |
| 2009/0234623 A1* | 9/2009 | Germain | E21B 43/00 |
| | | | 703/6 |
| 2010/0042458 A1* | 2/2010 | Rashid | E21B 43/122 |
| | | | 703/10 |
| 2010/0127888 A1 | 5/2010 | He et al. | |
| 2010/0250139 A1* | 9/2010 | Hobbs | H04Q 9/00 |
| | | | 702/6 |
| 2011/0120702 A1* | 5/2011 | Craig | E21B 43/26 |
| | | | 166/250.1 |
| 2011/0272144 A1 | 11/2011 | Belcher et al. | |
| 2012/0050521 A1* | 3/2012 | Fitzpatrick | G01V 99/00 |
| | | | 348/82 |
| 2012/0158337 A1* | 6/2012 | Singh | E21B 49/086 |
| | | | 702/84 |
| 2012/0203507 A1* | 8/2012 | Thomeer | E21B 41/0092 |
| | | | 702/183 |
| 2013/0290064 A1 | 10/2013 | Altamirano et al. | |
| 2013/0290066 A1* | 10/2013 | Altamirano | G06Q 10/0633 |
| | | | 705/7.27 |
| 2014/0040375 A1* | 2/2014 | Kannan | G06Q 10/101 |
| | | | 709/204 |
| 2014/0095114 A1* | 4/2014 | Thomeer | G06Q 10/20 |
| | | | 702/187 |
| 2014/0095554 A1* | 4/2014 | Thomeer | G06F 16/9535 |
| | | | 707/821 |
| 2015/0345281 A1* | 12/2015 | Cardellini | E21B 47/007 |
| | | | 340/853.2 |
| 2016/0154907 A1* | 6/2016 | Halabe | E21B 43/00 |
| | | | 703/7 |
| 2016/0186554 A1* | 6/2016 | Burgos | E21B 47/113 |
| | | | 166/250.01 |
| 2016/0358120 A1* | 12/2016 | Moore | G06Q 10/08 |

OTHER PUBLICATIONS

Creese, "Mobility for Enterprise 3CS: At the Tipping Point", Gartner Report, Retrieved from the Internet: https://www.gartner.com/doc/1921414/mobility-enterprise-cs-tipping-point, Feb. 10, 2012, 1 page.

Debeasi, et al., "Enterprise Mobility and Its Impact on IT", Gartner Report, Retrieved from the Internet: https://www.gartner.com/doc/1985016/enterprise-mobility-impact-it, Apr. 16, 2012, 2 pages.

Rozwell, "Best Practices for Capturing Knowledge From Retiring Employees", Gartner Report, Retrieved from the Internet: https://www.gartner.com/doc/2218815/best-practices-capturing-knowledge-retiring, Oct. 31, 2012, 1 page.

Rozwell, "Socialization of Knowledge Management Drives Greater Reuse", Gartner Report, Retrieved from the Internet: https://www.gartner.com/doc/2046916/socialization-knowledge-management-drives-greater, Jun. 13, 2012, 1 page.

* cited by examiner

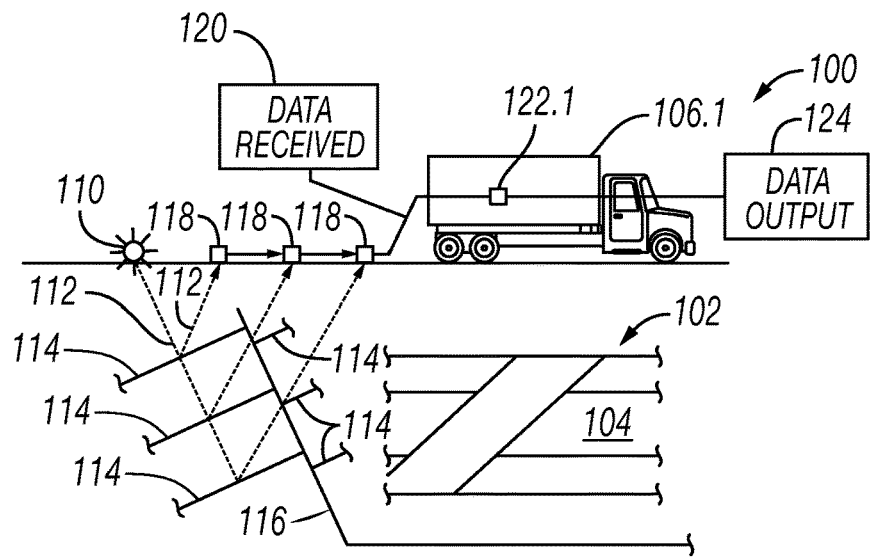
FIG. 1.1
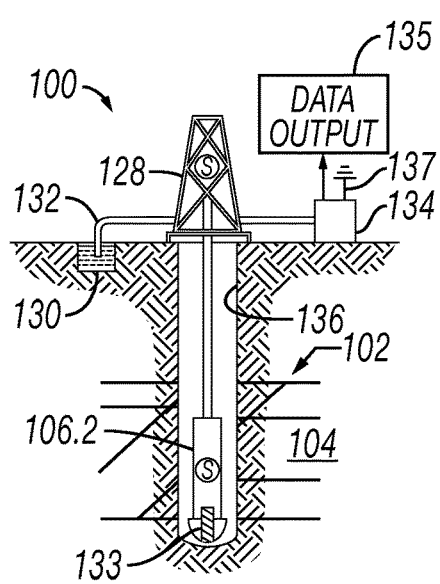
FIG. 1.2
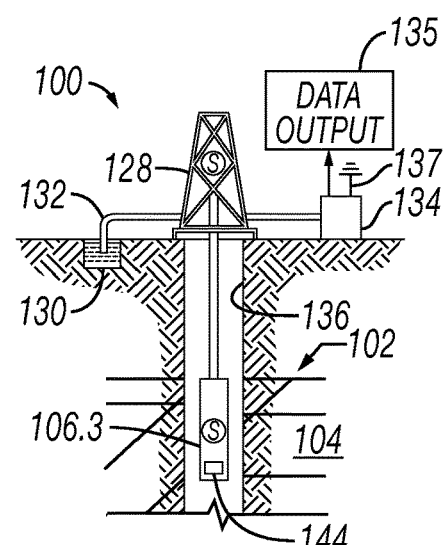
FIG. 1.3
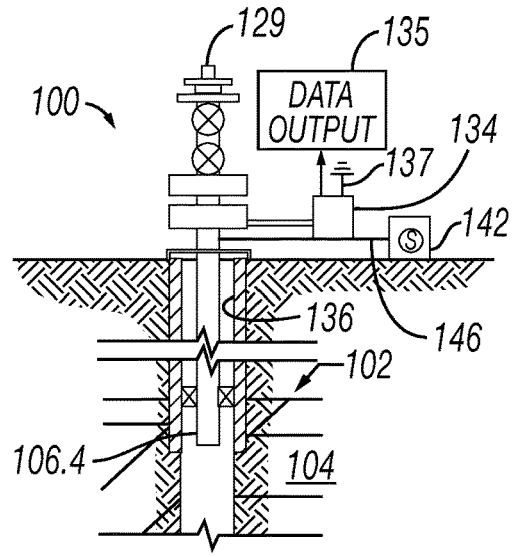
FIG. 1.4

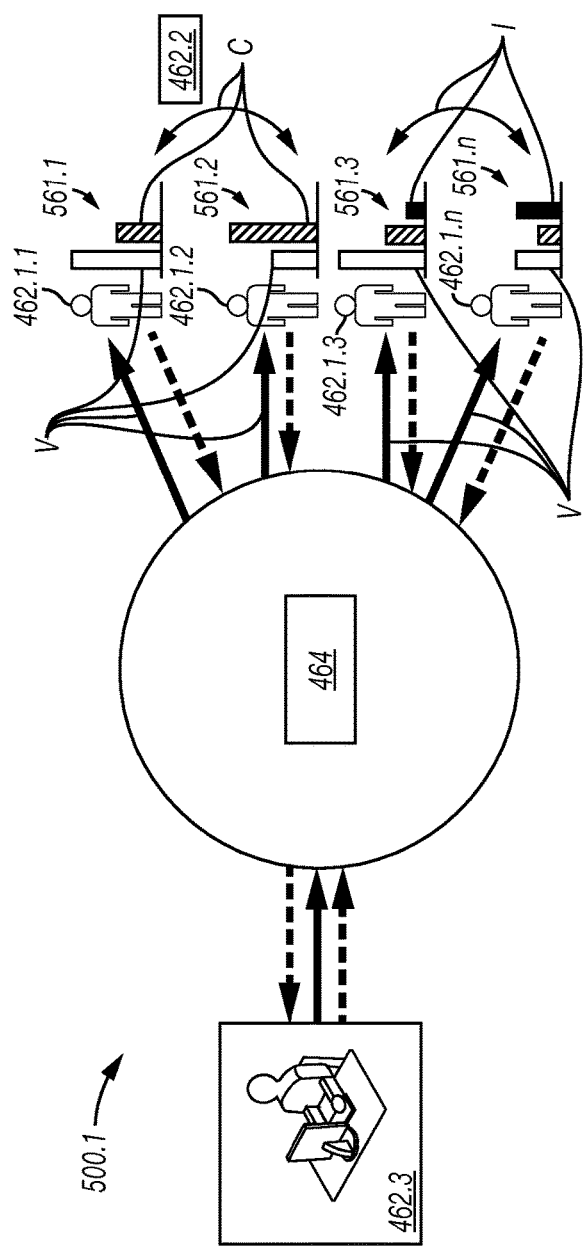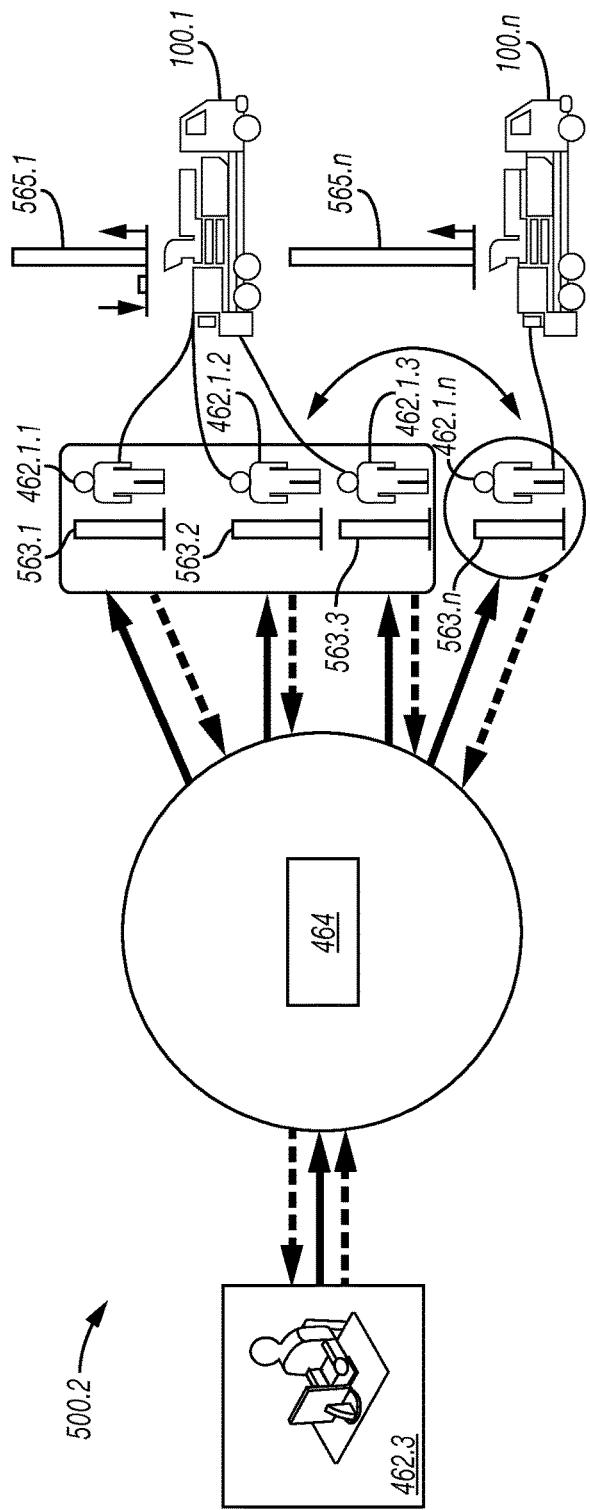
FIG. 5.1
FIG. 5.2

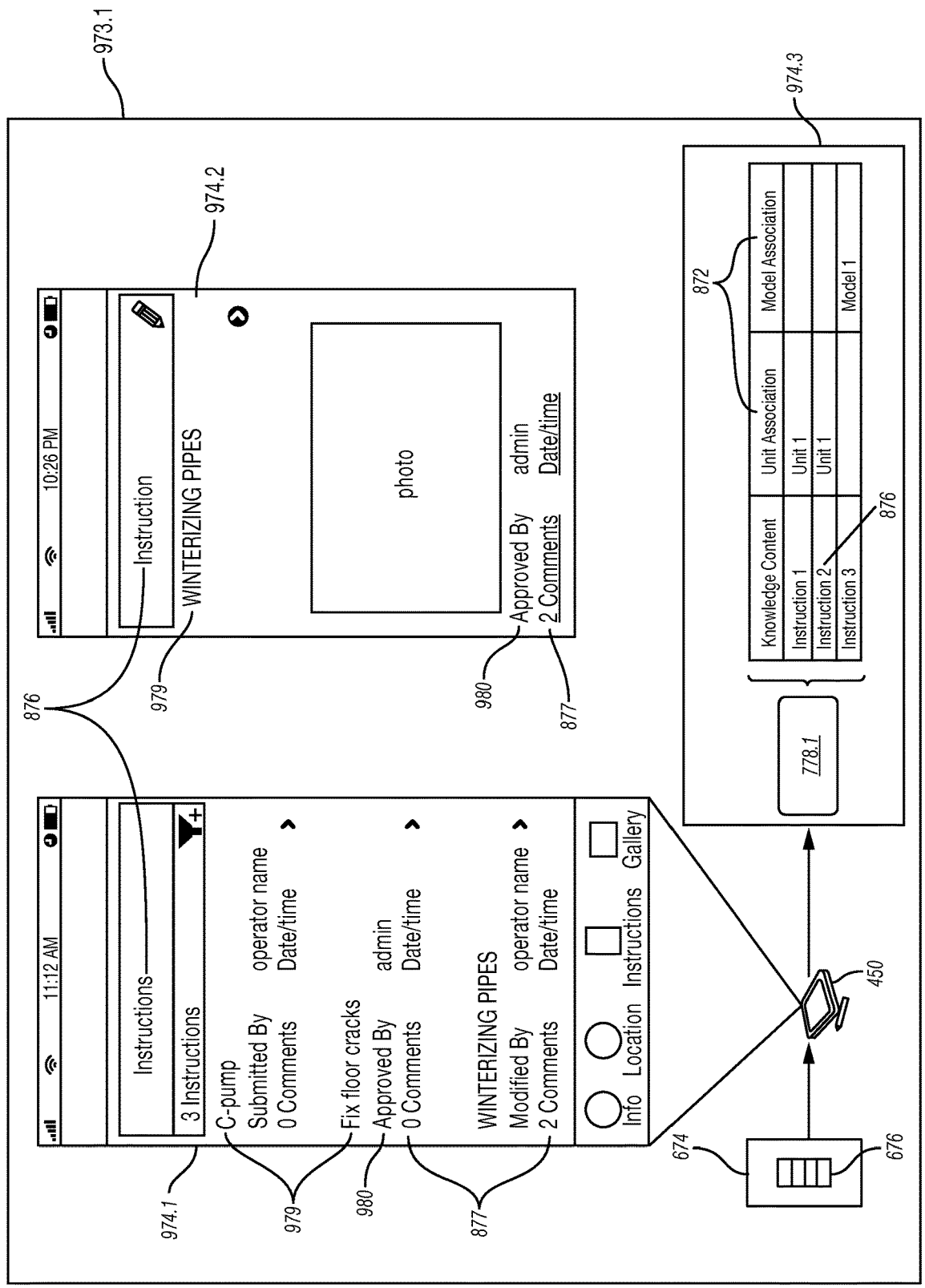
FIG. 9.1

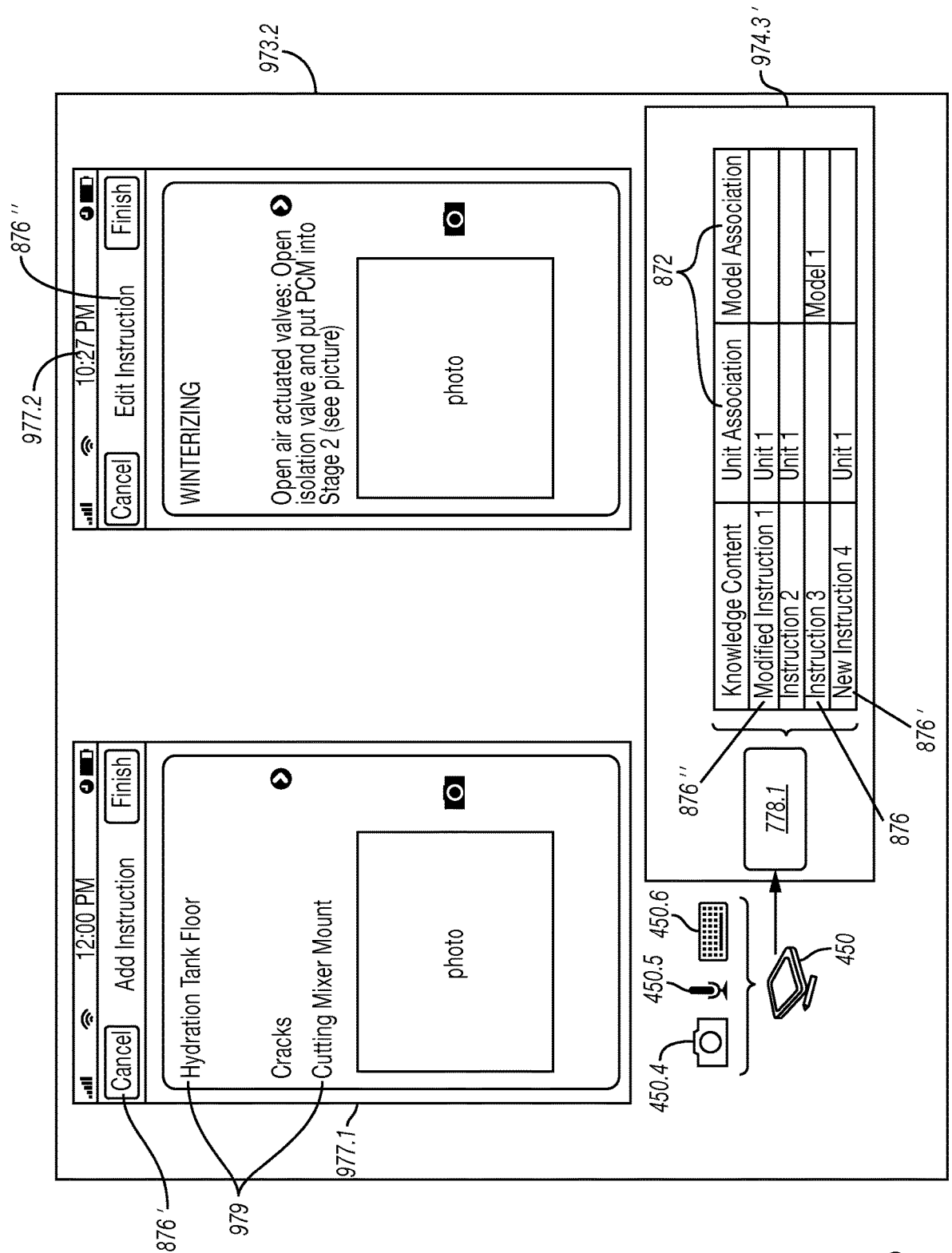
FIG. 9.2

Unit Details

UnitName Crew 1
UnitDescription The Mix unit is a hydralic unit that uses dry polymer powder.

ModifiedTime: Date/time
ModifiedBy: admin
Latitude: X
Longitude: Y
DistrictName: District1
ModelName: Z Edit | Back to List

Instruction Index

Create New

| Description | Unit | Status | Time |
|---|---|---|---|
| Winterizing Pipes | Crew 1 | Approved | Date/time |
| Fix Floor cracks | Crew 1 | Approved | Date/time |
| C-pump | Crew 1 | Approved | Date/time |

Edit | Details | Approve | Reject | Upgrade
Edit | Details | Approve | Reject | Upgrade
Edit | Details | Approve | Reject | Upgrade Home  Units  Instruction  Comments  Contact Message from webpage
Are you sure you want to associate this instruction to all units of the same model?
OK    Cancel 11:12 AM
Instruction
WINTERIZING PIPES
Warning
Are you sure you want to approve content of this instruction?
No    Yes
Modified By
2 Comments

| Knowledge Content | Unit Association | Model Association |
|---|---|---|
| Instruction 1 | Unit 1 | |
| Instruction 2 | Unit 1 | |
| Instruction 3 | | Model 1 |
| Instruction 4 | | Model 1 |

*FIG. 9.3*

COLLABORATIVE SYSTEM AND METHOD FOR PERFORMING WELLSITE TASKS

BACKGROUND

The present disclosure relates generally to oilfield operations. More specifically, the present disclosure relates to techniques for performing tasks, such as operating equipment, at a wellsite.

Wellbore operations are performed to produce various fluids, such as hydrocarbons, from subsurface reservoirs housed within subsurface formations. Wellbore operations may involve exploration, drilling, testing, completion, stimulation, production, and other operations. For example, seismic trucks may be used to locate subsurface reservoirs during exploration. Rigs may be placed at wellsites to create wellbores to reach the subsurface reservoirs during drilling and completion. Downhole tools may be used to retrieve fluids from the subsurface reservoirs during stimulation and production.

Operators may be provided at wellsites to perform the various wellsite operations. The operators may be provided with material, such as well plans and equipment specifications, to perform the wellsite operations. The operators may communicate with onsite and offsite personnel concerning the wellsite operations. Communications may involve passing information about the wellsite operations, such as delivery of equipment, wellsite data, and client specifications, between the onsite and offsite personnel. Examples of wellsite communication are provided in Patent Application Nos. US20130290066, US 20130290064, US20100127888, US20070168132, U.S. Pat. Nos. 7,103,511, 8,692,685, 8,616,274, and 8,154,419, and the entire contents of which is hereby incorporated by reference herein.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In at least one aspect, the disclosure relates to a collaboration system for performing wellsite tasks. The wellsite tasks are used for performing oilfield operations at a wellsite. The collaboration system includes a universal bank, a tag, a mobile unit, and a universal unit. The universal bank includes a storage unit to store wellsite content and wellsite instructions. The wellsite content comprising wellsite materials and wellsite instructions. The wellsite instructions include commands to perform the wellsite tasks. The tag is operatively connectable to the wellsite materials, and includes an identifier to uniquely identify the wellsite equipment and new wellsite materials. The mobile unit is carried by an operator at the wellsite, is operatively connectable to the universal bank via a wellsite communication link, and includes a wellsite input to upload the new wellsite material to the universal bank. The wellsite input includes a scanner to scan the tag. The mobile unit also includes a wellsite receiver to receive the wellsite instructions from the universal bank via the wellsite communication link. The universal unit is operatively connectable to the universal bank via a universal communication link, includes a universal receiver to receive the new wellsite materials from the universal bank, and includes a universal input to upload universal materials and validated wellsite instructions to the universal bank based on the input wellsite materials whereby validated wellsite materials and wellsite instructions are selectively accessible by the operator.

In another aspect, the disclosure relates to a collaboration method for performing wellsite tasks for performing oilfield operations at a wellsite. The collaboration method involves inputting wellsite content relating to a wellsite (the content including wellsite materials and wellsite instructions), passing the wellsite content to a universal bank, categorizing the wellsite content according to predetermined categories, defining wellsite instructions for performing the wellsite tasks based on the categorized wellsite content, selectively validating the wellsite content by universal resources, selectively providing access to the validated wellsite content to an operator (the validated wellsite content including validated wellsite instructions), and performing the validated wellsite instructions at the wellsite.

Finally, in another aspect, the disclosure relates to a collaboration method for performing wellsite tasks for performing oilfield operations at a wellsite. The collaboration method involves storing wellsite content including wellsite materials and wellsite instructions in a universal bank (the instructions comprising wellsite commands to perform the wellsite tasks), operatively connecting a tag to wellsite equipment (the tag includes a unique identifier containing wellsite materials relating to the wellsite equipment), inputting the wellsite material to the universal bank at the wellsite (the inputting including scanning the wellsite material from the tag), selectively providing the wellsite instructions from the universal bank to an operator at the wellsite based on the scanned wellsite materials, and implementing the provided wellsite instructions at the wellsite.

BRIEF DESCRIPTION OF THE DRAWINGS

Embodiments of a collaboration system and method of performing wellsite tasks are described with reference to the following figures. The same numbers are used throughout the figures to reference like features and components. Implementations of various technologies will hereafter be described with reference to the accompanying drawings. It should be understood, however, that the accompanying drawings illustrate only the various implementations described herein and are not meant to limit the scope of various technologies described herein.

FIGS. 1.1-1.4 are schematic views of various oilfield operations;

FIGS. 5.1 and 5.2 are schematic diagrams depicting various views of collaboration using the collaboration system;

FIGS. 9.1-9.3 are schematic diagrams depicting instructions;

DETAILED DESCRIPTION

Figure 2:
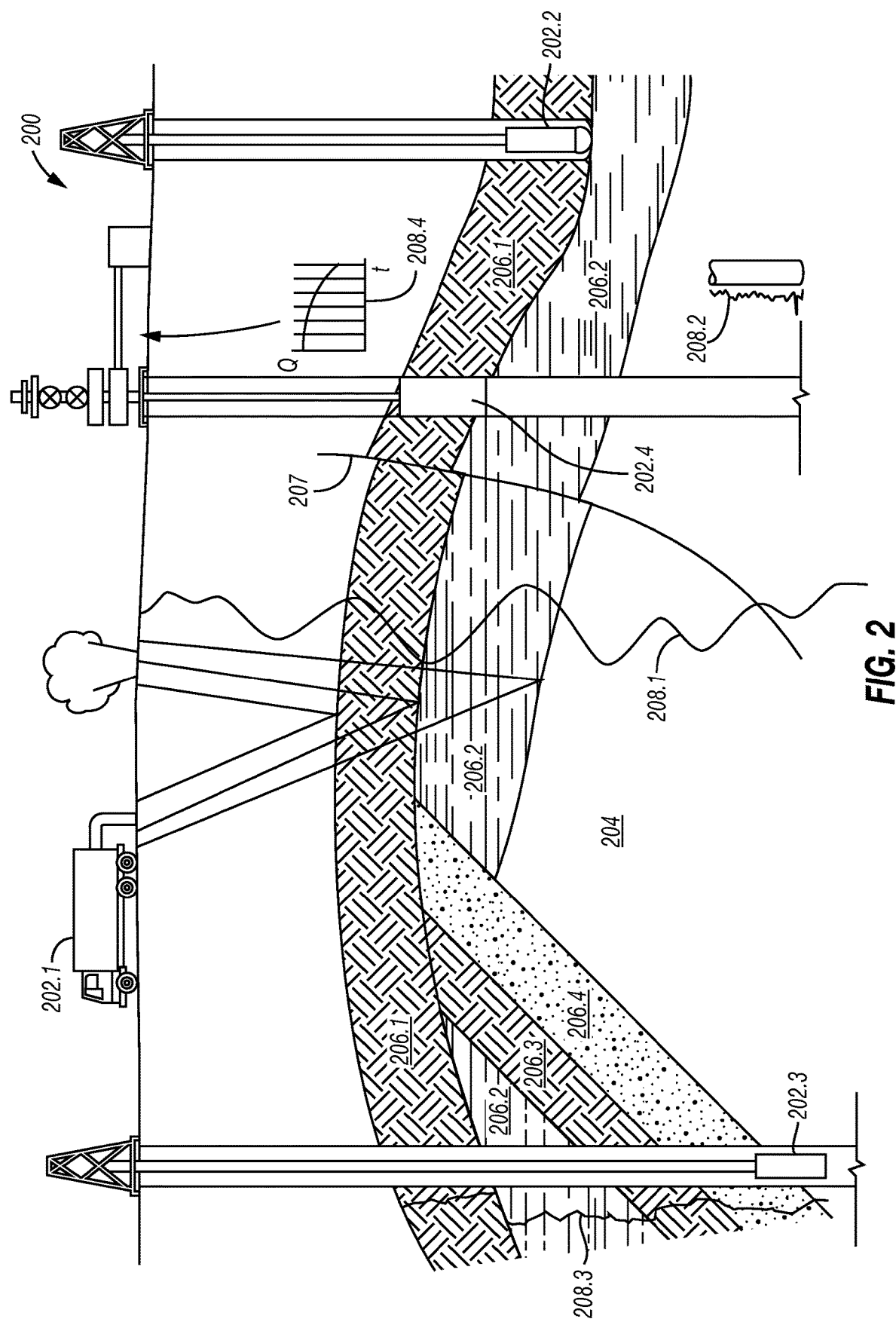
FIG. 2 is a schematic view, partially in cross section, of various oilfield operations at a wellsite.

The description that follows includes exemplary apparatuses, methods, techniques, and instruction sequences that embody techniques of the inventive subject matter. However, it is understood that the described embodiments may be practiced without these specific details.

The present disclosure relates to a collaborative system and method for performing tasks at a wellsite. Operators are positioned at the wellsite to perform the wellsite tasks. A universal bank is provided to enable collaboration between operators at the wellsite and resources away from the wellsite. The operator, local resources, and universal resources may upload materials to a universal bank. The local and universal resources may provide instructions for performing the wellsite tasks to the operator via the universal bank. The universal resources may selectively approve, modify, supplement, and/or release material and instructions to the universal bank for access by the operators.

Collaboration with local and universal resources may enable the operator to obtain expertise beyond that available at the wellsite, and to provide offsite resources with wellsite information at the wellsite. This collaboration may be used to provide communication between operators and resources, maintain a bank of material and instructions relating to a wide variety of equipment, reduce the use of erroneous information, provide consistency in operation, maintain levels of quality of the work, provide remotely accessible training on demand, generate best practices, generate specialized instructions retrofitted to specific wellsite configurations, maintain a bank of instructions updated over time, and/or ensure proper operation and maintenance of equipment.

The collaboration system provides a mobile solution at the wellsite for retrieval of materials in media-rich forms at the wellsite where it is used. The mobile solution may employ scanners and/or other mobile peripherals to facilitate content capture and indexing/categorizing of such content automatically for storage in the universal bank. Operators may use mobile units to access relevant and validated content contributed by universal resource or/or local resources. Users may comment and/or update the content to continuously and openly upkeep the content in the universal bank. The collaboration system also encourages users to update/contribute new content from any location, such as at the wellsite where the content is generated. The content may be updated automatically, continuously, monthly, quarterly, yearly, and/or at arbitrary intervals by select users, such as the universal resource.

Introduction

FIGS. 1.1-1.4 illustrate simplified, schematic views of an oilfield 100 having subterranean formation 102 containing reservoir 104 therein depicting various oilfield operations. One or more operators may be provided at the various oilfields 100 to perform wellsite tasks relating to the various oilfield operations.

FIG. 1.1 illustrates a survey operation being performed by a survey tool, such as seismic truck 106.1, to measure properties of the subterranean formation. The survey operation is a seismic survey operation for producing sound vibrations. In FIG. 1.1, one such sound vibration, sound vibration 112 generated by source 110, reflects off horizons 114 in earth formation 116. A set of sound vibrations is received by sensors, such as geophone-receivers 118, situated on the earth's surface.

Data received 120 is provided as input data to a computer 122.1 of a seismic truck 106.1, and responsive to the input data, computer 122.1 generates seismic data output 124. This seismic data output may be stored, transmitted or further processed as desired, for example, by data reduction. Computer facilities may be positioned at various locations about the oilfield 100 (e.g., the truck 122.1) and/or at remote locations.

FIG. 1.2 illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit 130. A circulating system may be used for storing, controlling, or filtering the flowing drilling muds.

The drilling tools may be advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

A wellsite unit 134 may be used to communicate with the drilling tools and/or offsite operations, as well as with other surface or downhole sensors. The wellsite unit 134 is capable of communicating with the drilling tools to send commands to the drilling tools, and to receive data therefrom. The wellsite unit 134 may also collect data generated during the drilling operation and produce data output 135, which may then be stored or transmitted. The operator(s) may use the wellsite unit 134 in performing their various wellsite tasks.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown) near the drill bit (e.g., within several drill collar lengths from the drill bit). The bottom hole assembly includes capabilities for measuring, processing, and storing material, as well as communicating with the wellsite unit 134. The bottom hole assembly further includes drill collars for performing various other measurement functions.

The bottom hole assembly may include a communication subassembly that communicates with the wellsite unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

The wellbore 136 may be drilled according to a drilling plan that is established prior to drilling. The drilling plan may set forth equipment, pressures, trajectories and/or other parameters that define the drilling process for the wellsite. The drilling operation may then be performed according to the drilling plan. As material is gathered, the drilling operation may deviate from the drilling plan. Additionally, as drilling or other operations are performed, the subsurface conditions may change. The earth model may also provide adjustment as new material is collected.

The data gathered by sensors (S) may be collected by the wellsite unit 134 and/or other data collection sources for analysis or other processing. The data collected by sensors (S) may be used alone or in combination with other data, such as the data received 120 for truck 106.1. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

The wellsite unit 134 may include transceiver 137 to allow communications between wellsite unit 134 and various portions of the oilfield 100 or other locations. Wellsite unit 134 may also be provided with or functionally connected to one or more controllers (not shown) for actuating mechanisms at oilfield 100. Wellsite unit 134 may then send command signals to oilfield 100 in response to data received. Wellsite unit 134 may receive commands via transceiver 137 or may itself execute commands to the controller.

A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems. The wellsite unit 134 may include a mobile unit coupled to or part of a collaboration system as is described further herein.

FIG. 1.3 illustrates a wireline operation being performed by wireline tool 106.3 suspended by rig 128 and into wellbore 136 of FIG. 1.2. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1.1. Wireline tool 106.3 may also provide data to wellsite unit 134. Wellsite unit 134 may collect data generated during the wireline operation and may produce data output 135 that may be stored or transmitted. Wireline tool 106.3 may be positioned at various depths in the wellbore 136 to provide a survey or other material relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition, fluid composition and/or other parameters of the field operation.

FIG. 1.4 illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown), into production tool 106.4 in wellbore 136, and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include stimulation operations and/or injection wells for added recovery. One or more gathering facilities may be operatively connected to one or more of the wellsites for selectively collecting downhole fluids from the wellsite(s).

While FIGS. 1.2-1.4 illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1.1-1.4, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to define the properties of the formation(s) and/or determine the accuracy of the measurements and/or for checking for errors. The plots of each of the respective measurements may be aligned and scaled for comparison and verification of the properties.

A production decline curve or graph 208.4 is a dynamic data plot of the fluid flow rate over time. The production decline curve may provide the production rate as a function of time. As the fluid flows through the wellbore, measurements are taken of fluid properties, such as flow rates, pressures, composition, etc.

Other data may also be collected, such as historical data, user inputs, economic material, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, for example below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. The seismic data displayed in static data plot 208.1 from data acquisition tool 202.1 may be used by a geophysicist to determine characteristics of the subterranean formations and features. The core data shown in static plot 208.2 and/or log data from well log 208.3 may be used by a geologist to determine various characteristics of the subterranean formation. The production data from graph 208.4 may be used by the reservoir engineer to determine fluid flow reservoir characteristics. The data analyzed by the geologist, geophysicist and the reservoir engineer may be analyzed using modeling techniques.

Figure 3:
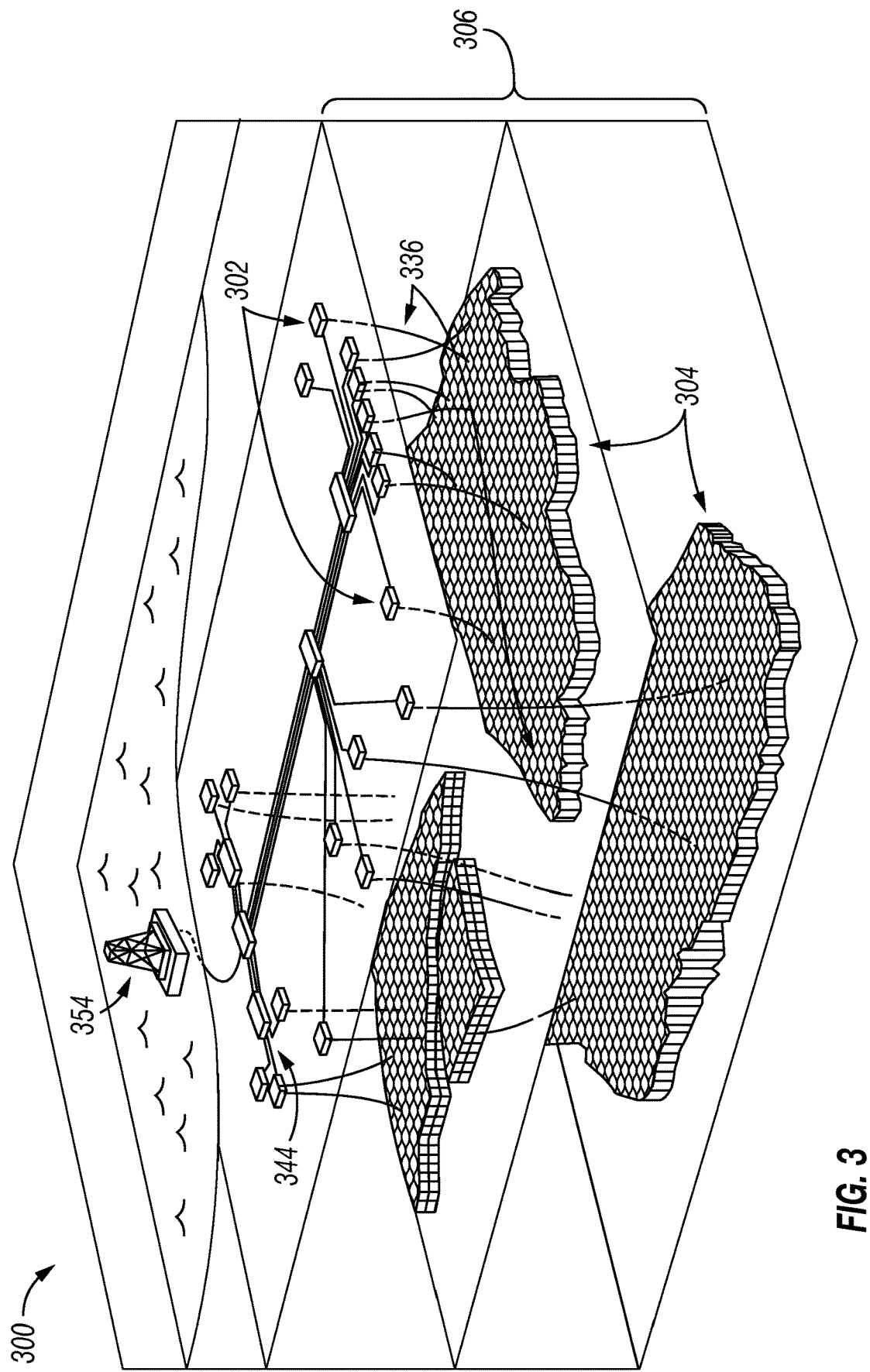
FIG. 3 is a schematic diagram of a production system for performing production operations.

FIG. 3 illustrates an oilfield 300 for performing production operations in accordance with implementations of various technologies and techniques described herein. As shown, the oilfield has a plurality of wellsites 302 operatively connected to central processing facility 354.

Each wellsite 302 has equipment that forms wellbore 336 into the earth. The wellbores extend through subterranean formations 306 including reservoirs 304. These reservoirs 304 contain fluids, such as hydrocarbons. The wellsites 302 draw fluid from the reservoirs and passes them to the processing facilities via surface networks 344. The surface networks 344 have tubing and control mechanisms for controlling the flow of fluids from the wellsite to the processing facility 354.

The field configurations of FIGS. 1.1-1.4 are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Collaboration

Operators are provided at wellsites to perform tasks relating to wellsite operations, such as those depicted in FIGS. 1.1-3. During wellsite operations, the operators may need instructions in order to perform various tasks at the wellsite. The operators may receive training before and after starting work at the wellsite. Such instructions may come from resources on or off the wellsite.

Figure 4:
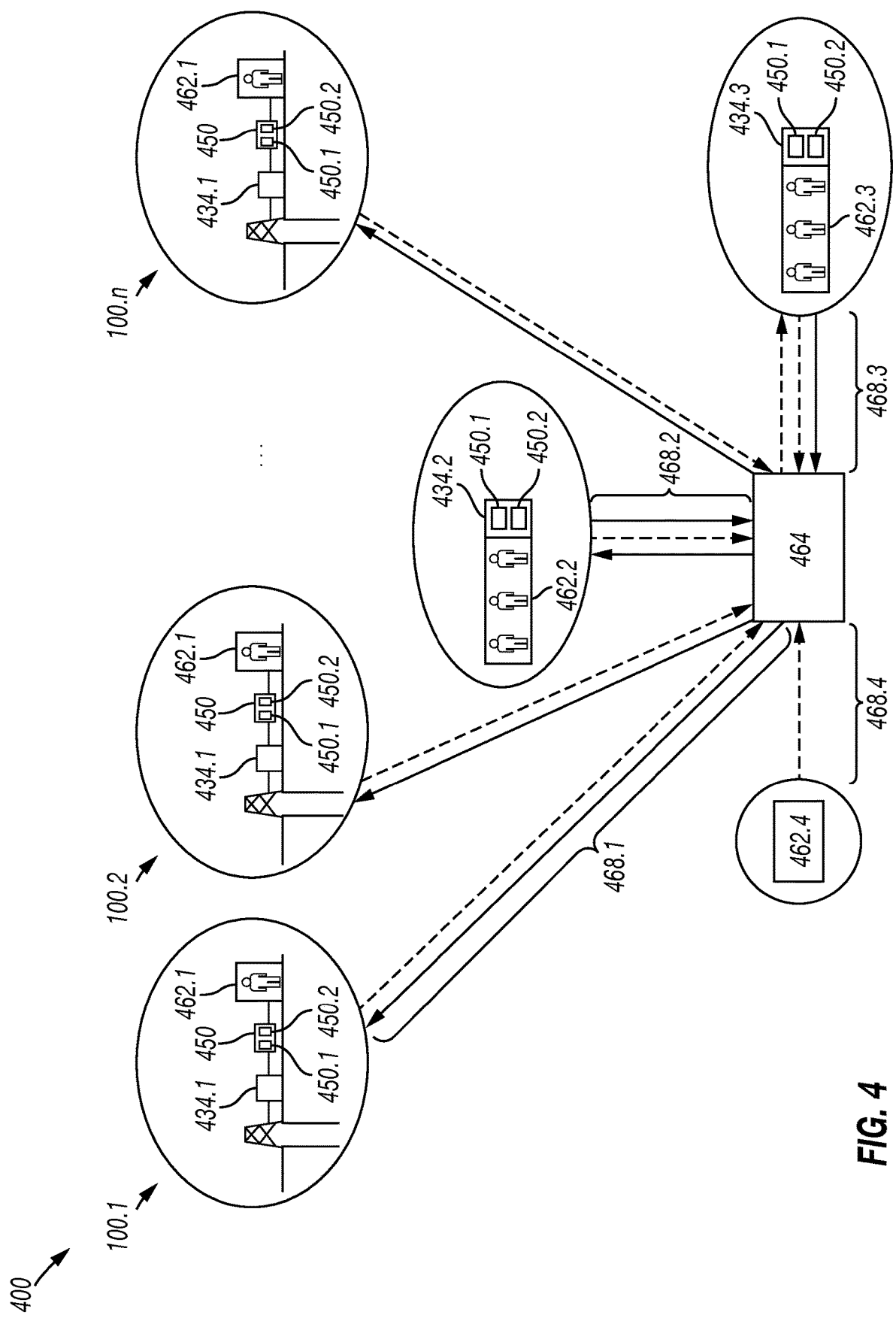
FIG. 4 is a schematic diagram of a collaborative system for performing wellsite tasks.

A centralized approach is provided to collect and validate information, and to provide instruction to the operators. FIG. 4 is a schematic diagram depicting a collaboration system 400 for performing the wellsite tasks. As shown, collaboration occurs between various users, such as operators 462.1 at the wellsites 100.1-100.*n*, local resources 462.2 at a local location (e.g., a regional office), universal resources 462.3 at a universal location (e.g., headquarters), and other resources 462.4** (which may be anywhere).

The local and universal resources 462.2, 462.3 may be located offsite away from direct knowledge of the wellsites 100.1-*n*. Operators 462.1 may be located at the wellsites 100.1-***n* away from the knowledge of various resources, such as geologists, geophysicists, petrophysicists, reservoir engineers, etc., that may be useful in performing the wellsite tasks. To bridge the gap between operators 462.1, local resources 462.2, and universal resources 462.3, a universal bank 464 is provided.

The various users (collectively referred to as 462) are connected via the universal bank 464. The universal bank 464 provides a centralized facility for storing content, such as materials and/or instructions, provided and accessible by the operators 462.1, local resources 462.2, universal resources 462.3, and additional resources 462.3. The universal bank 464 may include a database, server, and/or other storage device capable of receiving and storing the content for access by the users. Other electronics, such as processors, controllers, transceivers, etc., may be provided for communication, power, logic, etc.

The universal bank 464 may be used to provide a bank of content accessible by multiple operators 462.1 at the same or different wellsite. As new content is received, new instructions may be provided over time. The universal bank 464 may be used to provide a continuous process to retain and transfer content from existing users to new users, and between users of various levels of experience and/or expertise.

One or more operators 462.1 may be positioned at one or more of the wellsites 100.1-*n*. The operators 462.1 may work on the same wellsite at the same time or on different shifts, and may be relocated or replaced over time. Changes in operators 462.1 may vary depending on, for example, a scope and rate of workforce changes. The operators 462.1 may have various levels of experience and training.

To complete the required wellsite tasks, the operator 462.1 is provided with wellsite materials and instructions. For example, the operator 462.1 may be provided with wellsite materials available at the wellsite, such as wellsite data, manuals, training materials, roadmaps, etc. The operator 462.1 may have access to offsite materials via offsite sources, such as databases, telephone support, online support, bulletin boards, roadmaps, applications, and the world-wide web.

The operator 462.1 may also be provided with wellsite instructions, such as well plans, operating parameters, task instructions, equipment material, client specifications, commands, etc., to complete the wellsite tasks. For example, the wellsite instructions may be a list of commands for performing the wellsite task. Offsite instructions may be available to the operator 462.1 from the resources 462.2-462.4 located offsite. The operator 462.1 may be in communication with local resources 462.2 and universal resources 462.3 concerning wellsite tasks to be performed at the wellsite. The local and universal resources 462.2, 462.3 may be used to provide instructions to the operators 462.1 based on research, knowledge, experience, expertise, information, standards, and other information accessible to them.

The content (e.g., materials and instructions) contained in the universal bank 464 may be in the form of digital content, e.g., documents and media files. A knowledge portal, such as a dedicated website, can be built to host such files. These files may be viewed or downloaded by users at any location. Tools, such as a kPod, may also be developed to pre-fetch or store certain content so that knowledge is also available when the network access is down, e.g., at wellsites.

The operator 462.1 may access the content from the universal bank 464 using a wellsite unit 434.1 (which may be similar to wellsite unit 134). The wellsite unit 434.1 may include, for example, a terminal, a central processing unit (CPU), a database, and a power supply. The wellsite unit 434.1 may include or be coupled to peripherals 450, such as mobile unit (e.g., tablet, phone, laptop, or other handheld device).

The wellsite unit 434.1 and/or peripherals 450 may be coupled to the universal bank 464, local units, and/or other units via a networked environment. The network may include wired or wireless communication links, such as routers, modems, or other communication links, and networks, such as enterprise wide computer networks, intranets, the Internet, a local area network (LAN), a wide area network (WAN), etc.

The wellsite unit 434.1 may be provided with or coupled to the peripherals 450. The peripherals 450 may include wellsite input device 450.1 and/or wellsite output device (or receiver) 450.2. Input devices 450.1, such as a scanner 150, keyboard, pointing device (e.g., mouse), microphone, joystick, game pad, satellite dish, camera, drives, and/or other input devices, may be used to input wellsite materials into the wellsite unit 434.1. Output devices 450.2, such as a monitor, speakers, printers, and/or other output devices, may be provided to receive content from the wellsite unit 434.1.

The local resources 462.2 may have a local unit 434.2 and the universal resources 462.3 may have a universal unit 434.3, each with input and output devices 450.1, 450.2 for communication with the universal bank 464. The local and universal units 434.2 and 434.3 may be similar to wellsite unit 434.1.

The wellsite unit 434.1 is operatively connected to the universal bank 464 via a wellsite communication link 468.1. As shown, one or more wellsite units 434.1 may be connected to the universal bank 464 by one or more communication links 468.1. The communication link 468.1 may be used to pass wellsite materials from the wellsite 100 to the universal bank 464 as indicated by the dashed line.

Communication links 468.2-468.4 may be provided to pass local materials and instructions from local resources 462.2 to the universal bank 464, universal materials and instructions from universal resources 462.3, and additional materials from additional resources 462.4, respectively, to the universal bank 464 as indicated by the dashed arrows. Additional communication links and/or resources may be used to provide materials from other portions of the collaboration system 400.

By allowing users 462 to contribute materials to the universal bank 464, the wellsite materials may be saved and instructions developed for use by all users 462. The users 462 may contribute materials to the universal bank 464 relating to wellsite operations, such as operating conditions, delivered equipment, personnel, etc. The wellsite operators 462.1 may contribute wellsite materials using the wellsite unit 434.1 and/or peripherals 450.

Local resources 462.2 may also contribute local materials to the universal bank 464 relating to local operations, such as local best practices, local standards, etc. Universal resources 462.3 may also contribute universal materials to the universal bank 464, such as best practices corporate standards, research materials, customer requirements, government standards, etc. Other resources, such as historical resources, may contribute additional materials to the universal bank. The universal resources may contribute universal materials to the universal bank relating to universal operations, such as universal standards, corporate policies, and client specifications. The universal bank 464 may receive materials contributed from the operator 462.1 and the resources 462.2, 462.3 and store such materials for future access.

The communication links 468.1-468.3 may also be used to pass instructions from the universal resources 462.3 to the universal bank 464 and from the universal bank 464 to the operator 462.1 as indicated by the solid lines. Additional communication links and/or resources may be provided to send instructions to other portions of the collaboration system 400 as indicated by the solid lines. Other communication links may be provided, for example, between operators 462.1 at the wellsites 100.1-n, and/or between the operators 462.1 and the local resources 462.2.

The local resources 462.2 and the universal resources 462.3 may review the content added to the universal bank 464. Instructions, such as commands, operational steps, operating parameters, etc., may be added to the universal bank 464. The universal resources 462.3 may be used to review, adjust, validate, and release the instructions uploaded into the universal bank 464. The universal resources 462.3 may also be used to restrict access to certain content in the universal bank 464, such as content determined to be sensitive and/or incorrect.

FIGS. 5.1 and 5.2 show alternate views of collaboration 500.1, 500.2 using the collaboration system 400. FIGS. 5.1 and 5.2 schematically depict the operators 462.1.1-462.1n contributing wellsite materials to the universal bank 464 as indicated by the dashed lines, and the universal resources 462.3 sending and receiving content to and from the wellsite 100 via the universal bank 464 as indicated by the dashed arrows. The universal resources 462.3 also send validated content to the universal bank 464 for use at the wellsite as indicated by the solid arrow.

As schematically depicted in FIG. 5.1, multiple operators 462.1.1-462.1.n may be in communication with various resources. For example, operators 462.1.1 and 462.1.2 may obtain content from local resources 462.2 and/or from the universal bank 464, and operators 462.1.3 and 462.1.4 may exchange content each other and with the universal bank 464 as indicated by the arrows. In this version, the local resources 462.2 are depicted as communicating with the universal bank 464 solely through the operators 462.1, but may optionally be linked directly to the universal bank 464 for communication therewith.

As indicated by the bar graphs 561.1-561.3, the operators 462.1.1-462.1.n may have different levels of knowledge, experience, training, and/or other expertise, and/or may receive content from various sources, and/or may receive correct (C), incorrect (I), and/or validated (V) content. For example, the content passed between operators 462.1.3 and 462.1.4 may be incorrect (I) as indicated by the curved arrow, the content passed between the operators 462.1.1, 462.1.2 and local resources 462.2 may be correct (C), and the content received from the universal bank 464 may be reviewed and confirmed to be correct and, therefore, validated (V).

As indicated by the graphs 561.1-561.*n*, at least some of the content contributed by the operators 462.1.1-462.1.*n* to the universal bank 464 may be incorrect. The graphs 561.1-561.*n* depict the validated information (V) as a white bar, the correct information (C) as a cross-hatched bar, and the incorrect information (I) as a shaded bar. In such cases, the universal resources 462.3 may either deleted, adjust, or supplement the incorrect content and resend them as validated content to the universal bank 464 for access by the operators. 462.1.

FIG. 5.1 demonstrates the use of the universal bank 464 for receiving correct and incorrect materials as indicated by the dashed lines, providing review by the universal resources, and returning validated content and instructions back to the operators 462.1-*n*. In this manner, materials from multiple users may be gathered and validated before use, thereby eliminating incorrect materials. The validated content may be shared by operators 462.1 and/or local resources 462.2.

FIG. 5.2 shows use of validated materials across a group of operators 462.1.1-462.1.*n*. Validated content send to the universal bank 464 may be passed to the various operators 462.1.1-462.1.*n*. Since the content has been reviewed and confirmed to be correct, incorrect information has been removed. As shown by the graphs 563.1-563.*n*, after validation, all content is considered to be correct. As indicated by graphs 565.1 and 565.*n*, the validated content, including validated wellsite instructions implemented at the wellsite 100.1 increases and the amount of incorrect instructions decreases.

As also shown by FIG. 5.2, the validated content is exchanged between operators 462.1.1-462.1.3 with another operator 462.1.*n* at another wellsite 100.*n* as indicated by the curved arrow. While not shown, the validated content may also be exchanged via local resources to one or more wellsites. This schematically demonstrates knowledge sharing of validated materials across multiple wellsites 100.1-100.*n*.

Figure 6:
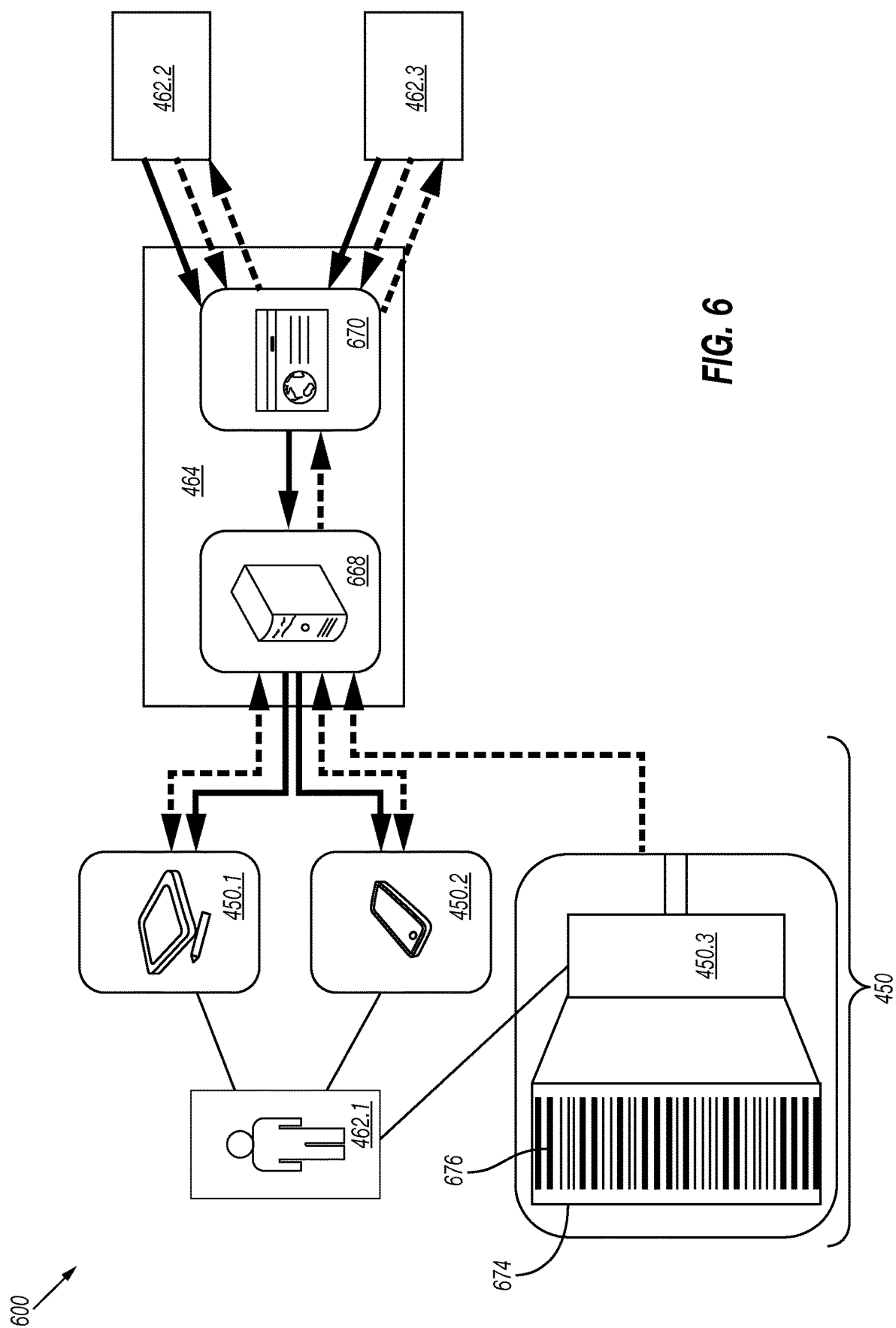
FIG. 6 is a schematic diagram depicting another view of the collaboration system.

FIG. 6 depicts an example collaboration system 600 usable as the collaboration system 400. In this example, the operator 462.1 communication with the universal bank 464 via peripherals 450. As shown, the peripherals 450 may be in the form of mobile units, including a tablet 450.1, a handheld device (e.g., mobile phone) 450.2, and a scanner 450.3. The mobile units may be handheld units to facilitate capturing and/or receiving content at the wellsite.

The mobile devices 450 are coupled to the universal bank 464. In this version, the universal bank 464 includes a data server 668 and an interface 670. The content server 668 may be used to store content (e.g., materials and instructions from various users). The mobile units 650 may periodically sync with the server 668. The interface 670 may be, for example, a web interface accessible by the users 462.

The mobile devices 450 may include input devices (e.g., 450.1 of FIG. 4) to send wellsite materials to the universal bank 464 using the web interface 670. The wellsite material may be collected via the mobile devices 450 and passed to the content server 668. For example, the operator 462.1 may enter certain wellsite into the universal bank 464 by data entry using the mobile devices 450.1, 450.2. The operator 462.1 may also use the scanner 450.3 to scan wellsite material stored in a tag 676 positioned on wellsite equipment 674.

The tag 676 may be any device capable of storing information on items, such as the wellsite equipment 674, wellsite materials, etc. The tag 676 may be, for example, a barcode affixed to a piece of wellsite equipment, a near field communication (NFC) for transferring data between devices, a radio-frequency identification (RFID) tag, a global positioning system (GPS), or other equipment. The mobile device 450 may have corresponding devices capable of reading the tags, such as scanner 450.3

The tag 676 may identify knowledge content associated with a given equipment and/or its model. Additional information, such as wellsite, operator, client, or other information, may also be applied to the tag 676. Material collected on the tag 676 may be uploaded to the universal bank 464 via the mobile unit 450. Once uploaded, the material may be made available to the operator 462.1, local resources 462.2, and/or universal resources 462.3.

Figure 7:
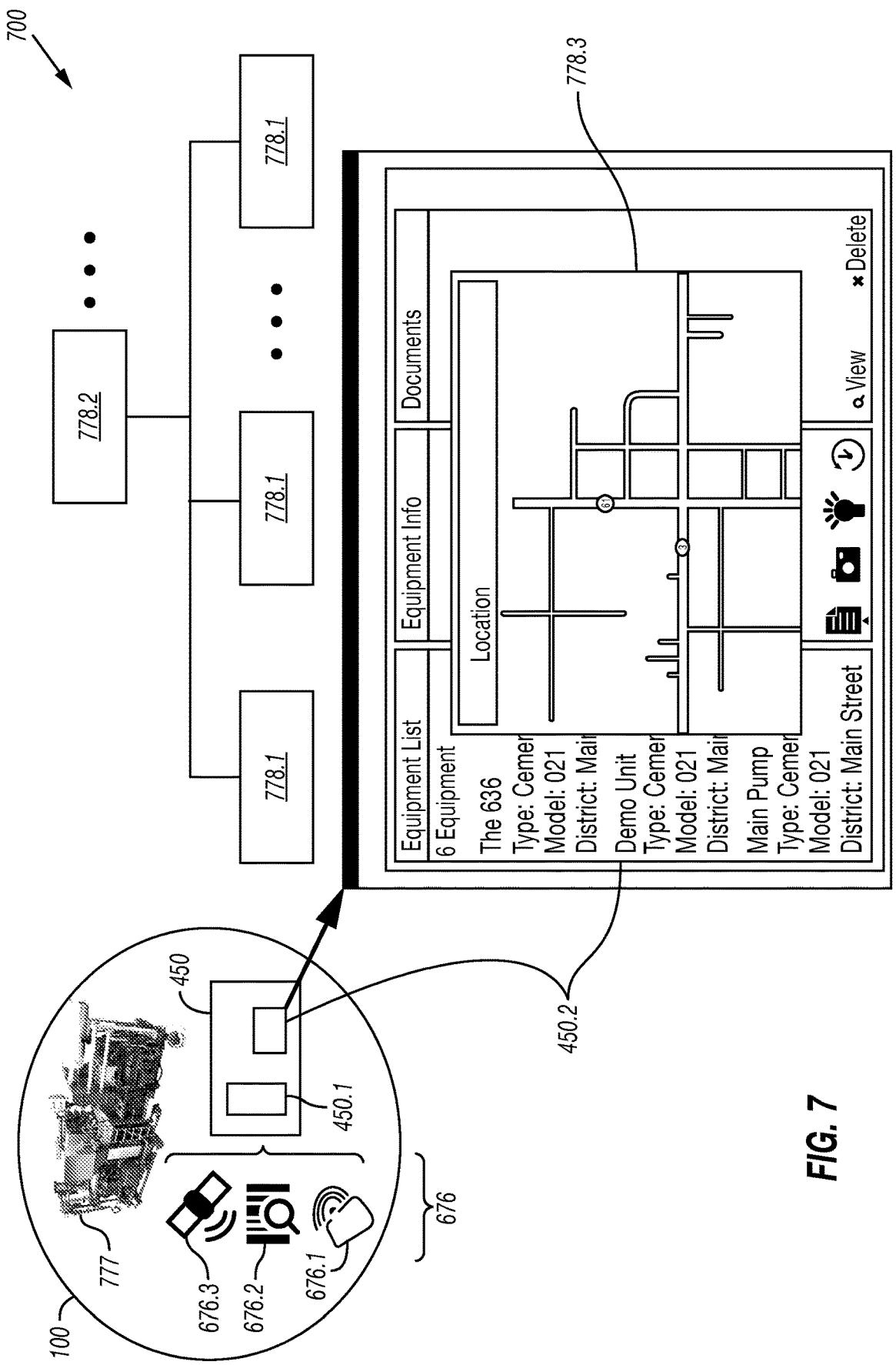
FIG. 7 is a schematic diagram depicting input of wellsite materials at the wellsite.

FIG. 7 is a schematic diagram showing identification 700 of wellsite equipment 777 at a wellsite 100 using a mobile unit 450. As shown by this diagram, the mobile unit 450 may be used to read information from the tag 676 using an input device 450.1. The input device 450.1 may be used to read various tags 676, such as an RFID 676.1, bar code 676.2, or GPS 676.3.

The tag 676 may contain information concerning unit number 778.1, model number 778.2, and location 778.3. As shown, the tag may be used to provide displays, such as a listing of unit number 778.1 and model number 788.2, and a map depicting the location 778.3. Other information, such as the equipment type, wellsite location, and/or other information, may also be included. The information may be used to classify the equipment into various categories, such as the unit number 778.1, model number 778.2, and location 778.3. The uploaded information may be viewable using an output device, such as a monitor 450.2.

After the mobile unit 450 identifies the wellsite associated with a given tag 676, it may sync with the content server 668 so that newly generated or updated instructions are sent to the universal bank 464 for validation as shown in FIG. 6. Content validation actions may be sent to the universal bank 464, and/or instructions associated with a particular unit/model and their status are updated. Users 462 may adjust the content collaboratively by editing wellsite materials together and associating such materials with the particular unit/model.

The mobile device 450 may also be used to receive and display the wellsite instructions from the universal bank 464 via the web interface 670 (FIG. 6). The operator 462.1 may carry the mobile device 450 to selectively input wellsite materials and receive wellsite instructions as needed during the wellsite operations. Based on the received instructions, the operator 462.1 may perform the various wellsite tasks.

To properly index and categorize content added to the universal bank 464, the universal resources 462.3 with knowledge of terminology and familiarity with the technology may review and identify the content in the universal bank 464. In some cases, the operator 462.1 may be provided with a structured input with pre-existing categories for uploading material.

Figure 8:
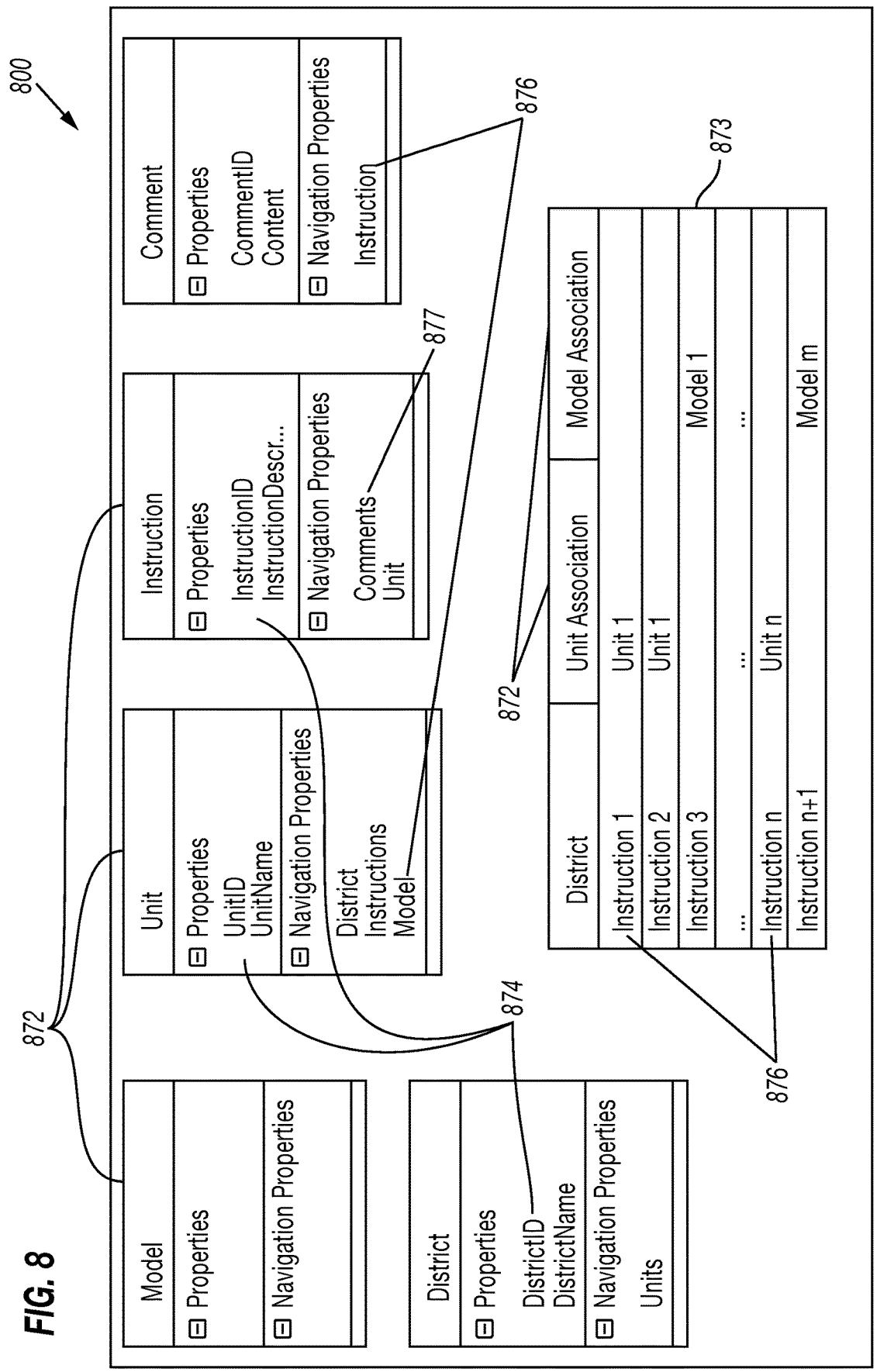
FIG. 8 is a schematic diagram depicting categorization of wellsite materials.

FIG. 8 is a schematic diagram depicting categorization 800 of content. As shown, the categorization 800 defines categories 872, such as model, district, unit, instruction, and comments, and a display 873. At least some categories 872 may include material, such as content types, best practice, specific instruction sets, etc. Each 872 category may include properties 874, such as unit ID, unit name, etc.

For each category 872 various outputs, such as instructions 876 and comments 877, may be provided. Display 873 may display instructions associated with a given category 872. As shown, instructions 1–n+1 are provided for corresponding units and models. Each piece of content may be related to individual items that form instructions. For each instruction 876 displayed on display 873, various forms of material, such as images, video, text, and other digital media, may be provided.

Content uploaded to the universal bank 464 may be organized and identified to facilitate access to such content. Content provided by users 462 may be indexed and categorized. The incoming content may be identified using, for example, asset management. Equipment may be identified by a unique identifier recorded with the equipment using the tag. Equipment tags may provide information, such as model number, equipment specs, supplier, etc.

The categorization 800 may be organized, for example, into a model/unit hierarchy. In the example shown in FIG. 8, each piece of content may be associated with a unit or model. Updates may be associated with a specific unit from which they are generated. The universal resources 462.3 may validate the updates and change certain instructions association to the model level. For example, a best practice developed at a given wellsite may be shared to all operators at the same wellsite. Similarly, best practices for certain equipment may be shared with other using the same equipment.

Content updates may be associated with the specific unit from which they are generated. Therefore, material about certain equipment provided by operators may be retained and retrieved for use by new operators even after personnel changes. On the other hand, specific content can be promoted from a particular unit to the model level. For example, a best practice developed at one unit can be shared with all crews operating units of the same model.

If an instruction is associated with a model, it is applicable to all units of the same model. Each instruction may have multiple comments. Comments can be added to each instruction like discussions at an email list or bulletin boards on a particular topic. The content item may have other categorizations beside the unit/model association which can be used to provide finer granularity of content management. Certain content may apply to units of the same model. Such content may be associated with the model so that it is available upon request for a different unit of the same model.

FIGS. 9.1-9.3 show example displays 973.1, 973.2, 973.3 depicting instructions generated using collaboration. As shown in the display 973.1 of FIG. 9.1, instructions 876 are provided to the operator 462.1. The operator 462.1 may request an instruction 876 for performing a given wellsite task 979, such as using a c-pump, winterizing pipes, or fixing floor cracks, as shown in display 974.1. The operator 462.1 may input certain information concerning the model and unit 778.1, for example, using a bar code 676 scan 450 of the pipes 674 to be winterized. The wellsite materials and request are passed to the universal bank 464.

Based on the request and wellsite materials provided, the universal bank 464 may sort through the wellsite materials and associated instructions 876 in the universal bank 464, and automatically send instructions matching the request as shown in display 974.2. The universal bank 464 locates applicable instructions 876 for a given unit/model number. In this example, the instructions 876 are associated with a specific unit and model based on the information provided by the bar code 676 scan.

The universal resources 462.3 may assign applicable instructions for the given model/unit number. The instructions 876 for the specific unit are made available to the operator 462.1 for implementation at the wellsite. The instructions 876 provide specific tasks, photos, and other information useful in performing the wellsite tasks 979. Comments 877 and the approver 980 may also be provided. A list of instructions 876 and associated categories 872, such as unit and model, may also be displayed on display 974.3.

As shown in FIG. 9.2, display 973.2 depicts content contribution and associated validation of instructions 876 of FIG. 9.1. The instructions 876 may be validated by the universal resources 972.3 as new content is presented. As shown, wellsite materials may be input by mobile unit 450 by camera 450.4, microphone 450.5, and keyboard 450.6, may be added to the universal bank 464 using mobile unit 450. The wellsite materials 979 may be categorized under unit 778.1. Based on the wellsite materials and unit 778.1, instructions 876 may be provided.

In some cases, new instructions 876' may be added as shown in display 977.1 or modified into modified instructions 876" as shown in display 977.2 based on the wellsite materials 979 provided. Original, new and/or modified instructions 876, 876', 876" for a specific unit/model may be provided to the operator 462.1 on modified display 974.3'.

FIG. 9.3 depicts approval and validation of instructions presented to the universal bank 464 on a display 973.3. The approval and validation may be performed using a web interface 670, such as that shown in FIG. 6. The universal resources 462.3 may review and approve certain wellsite materials and instructions 876 in the universal bank 464. For example, the universal resources 462.3 may receive wellsite materials, such as wellsite information, and local instructions 876 used to perform wellsite tasks 979 as shown in display 978.1.

The universal resources 462.3 may associate the new material with a given instruction 876. The universal resources 462.3 may also selectively approve instructions 876 and provide the approve instructions for access by the operators 462.1. Warnings 981.1 and 981.2 may also be provided. Each instruction may be provided with a status indicator 981 as shown in display 978.2. The display 974.3" shows instruction 876 for categories 872 after validation.

Figure 10:
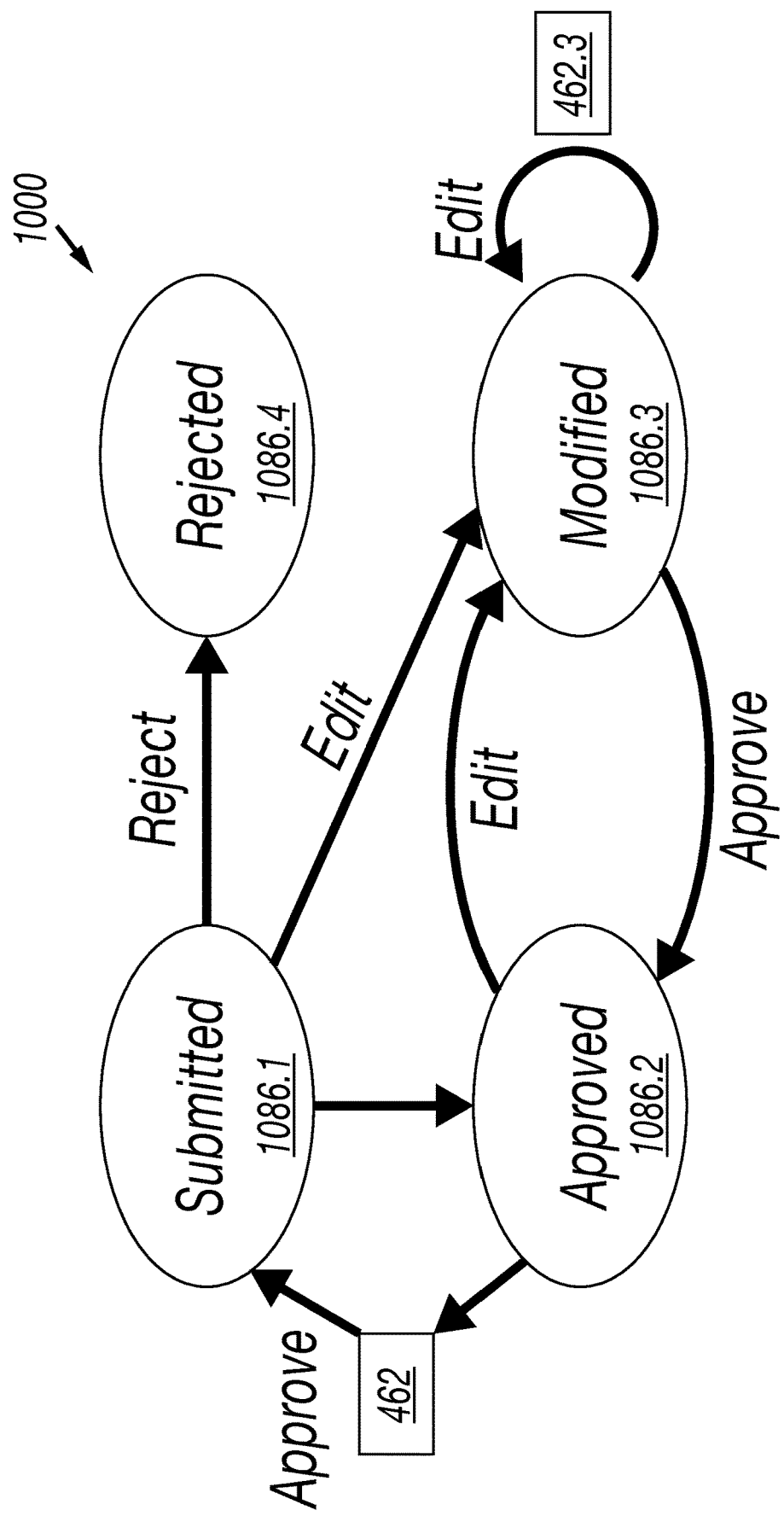
FIG. 10 is a schematic diagram depicting validation.

To prevent the communication of incorrect information and/or the possible addition of invalid content to the universal bank 464, validation by experienced and trained universal resources 462.3 may be provided. FIG. 10 shows an example validation process 1000. The universal resources 462.3 may review submitted materials 1086.1 received in the universal bank 464 and either approve, reject or edit them. Approved materials 1086.2 may be immediately approved for release to some or all users 462.

The submitted materials 1086.1 and/or the approved wellsite materials 1086.2 may be edited from time to time to generate modified materials 1086.3. The modified wellsite materials may be re-edited as needed until approved for release as approved materials 1086.2. Rejected wellsite materials 1086.4 are deleted and access to such materials may be restricted.

Based on the material received and/or adjusted, instructions may be provided to the users 462. In some cases, existing instructions for performing the wellsite tasks may be present in the universal bank that may be provided to the operators. In some cases, existing instructions may be adjusted or new instructions may be created for performing the wellsite tasks. These adjusted and/or new instructions may be added to the universal bank and provided to the user 462.

Various policies may be utilized to determine who has the authority for approval. A group of selected experts may be provided with roles as universal resources 462.3 for one or more specific instructions and/or wellsite materials. The validation process 1000 may provide for continuous contribution of materials and instructions, continuous validation and updating of such materials. The validation process 1000 may also be used with categorization and identification to facilitate location of and access to materials and instruction, for example, using a model/unit hierarchy.

Figure 11:
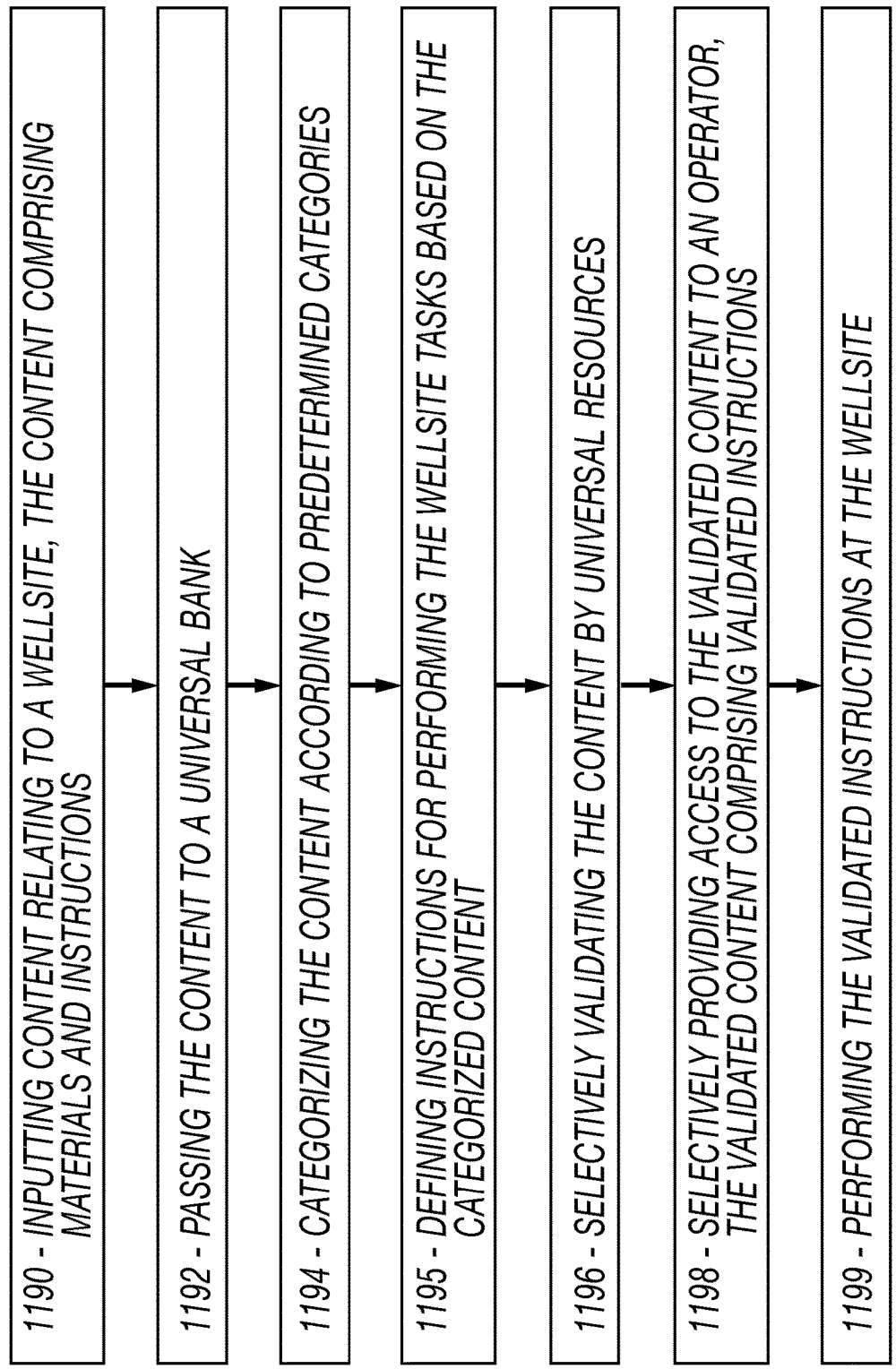
FIG. 11 is a flow chart depicting a collaborative method for performing wellsite tasks.

FIG. 11 shows a flow chart depicting a collaborative method 1100 of performing wellsite tasks. As shown in this flow chart, the method 1100 involves 1190—inputting content relating to a wellsite (the content comprising materials and instructions), 1192—passing the content to a universal bank, 1194—categorizing the content according to predetermined categories, 1195—defining instructions for performing the wellsite tasks based on the categorized content, 1196—selectively validating the content by universal resources, 1198—selectively providing access to the validated content to an operator (the validated content comprising validated instructions), and 1199—performing the validated instructions at the wellsite.

The selectively approving may involve editing, modifying, adding, supplementing, replacing, and/or rejecting. The categorizing 1194 may involve defining a model and a unit number for each content. The inputting 1190 may involve scanning, typing, photographing, videoing, and/or uploading. The method may also involve applying a tag with information about the wellsite materials to the wellsite materials, and the inputting 1190 wellsite materials may involve comprises scanning the tag. The method may also involve providing comments with the validated content to the operator.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims may not be limited to the specific features or acts described above. Rather, the specific features and acts described above are disclosed as example forms of implementing the claims.

Although only a few example embodiments have been described in detail above, those skilled in the art will readily appreciate that many modifications are possible in the example embodiments without materially departing from this invention. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A collaboration method for performing wellsite tasks for performing oilfield operations at a wellsite, the collaboration method comprising:

inputting wellsite content relating to equipment associated with a wellsite using a device associated with the wellsite, the wellsite content comprising wellsite materials indicative of a type of the equipment and a request for wellsite instructions, the wellsite instructions comprising well plans, operating parameters, task instructions, equipment materials, specifications, commands, or any combination thereof, to perform the wellsite tasks associated with the type of the equipment;

passing the wellsite content to a universal bank using a communication link communicatively coupling the universal bank and the device, wherein the universal bank stores additional wellsite materials;

categorizing the wellsite content according to predetermined categories based on the type of the equipment and the additional wellsite materials;

defining the wellsite instructions for performing the wellsite tasks associated with the type of the equipment based on the categorized wellsite content;

validating the wellsite materials and the wellsite instructions by utilizing at least one universal resource and at least one local resource accessible by the universal bank, wherein the at least one universal resource contributes universal materials relating to universal operations to the universal bank and the at least one local resource contributes local materials relating to local operations to the universal bank, the at least one universal resource and the at least one local resource performing at least one of editing, modifying, adding, supplementing, replacing, and rejecting the wellsite materials and the wellsite instructions in order to validate the wellsite content; providing access to the validated wellsite content to an operator, the validated wellsite content comprising the validated wellsite instructions; and performing, by the operator, the wellsite tasks related to the validated wellsite instructions at the wellsite, wherein the operator performing the wellsite tasks utilizes the validated wellsite instructions to perform the wellsite tasks.

2. The collaboration method of claim 1, wherein categorizing comprises defining a model and a unit number for each wellsite content.

3. The collaboration method of claim 1, wherein inputting comprises at least one of scanning, typing, photographing, videoing, uploading, and combinations thereof.

4. The collaboration method of claim 1, further comprising applying a tag with information about the wellsite materials to wellsite equipment, and wherein inputting the wellsite content comprises scanning the tag.

5. The collaboration method of claim 1, further comprising providing comments with the validated wellsite content.

6. The collaboration method of claim 1, wherein the wellsite materials comprise at least one of photos, audios, videos, documents, media files, and digital files.

7. The collaboration method of claim 1, wherein the universal bank comprises a central processing unit, a database, a power supply, and a transceiver.

8. The collaboration method of claim 1, wherein the operator comprises at least one of a person and a controller.

9. The collaboration method of claim 1, wherein the at least one universal resource and the at least one local resource comprises at least one of a person and a controller.

10. The collaboration method of claim 1, wherein the universal bank comprises a server.

11. The collaboration method of claim 4, wherein the tag is operatively connectable to wellsite equipment, the tag comprising an identifier to uniquely identify the wellsite equipment and new wellsite materials.

12. The collaboration method of claim 4, wherein the tag comprises an identifier to uniquely identify the wellsite equipment and new wellsite materials.

13. The collaboration method of claim 12, wherein the identifier defines for each wellsite material at least one of a unit, a model, a location, and combinations thereof.

14. The collaboration method of claim 13, wherein the universal bank comprises categories to store the wellsite material according to the identifier.

15. The collaboration method of claim 4, wherein the tag comprises one of a radio-frequency identifier, a barcode, global positioning satellite identifier, and a near field communication identifier.

16. The collaboration method of claim 1, wherein providing access comprises selectively restricting access to at least some of the wellsite materials and the wellsite instructions.

* * * * *